April 15, 1930.    A. S. CLAYTON    1,754,610
ANIMAL CARRIER
Filed Sept. 10, 1928
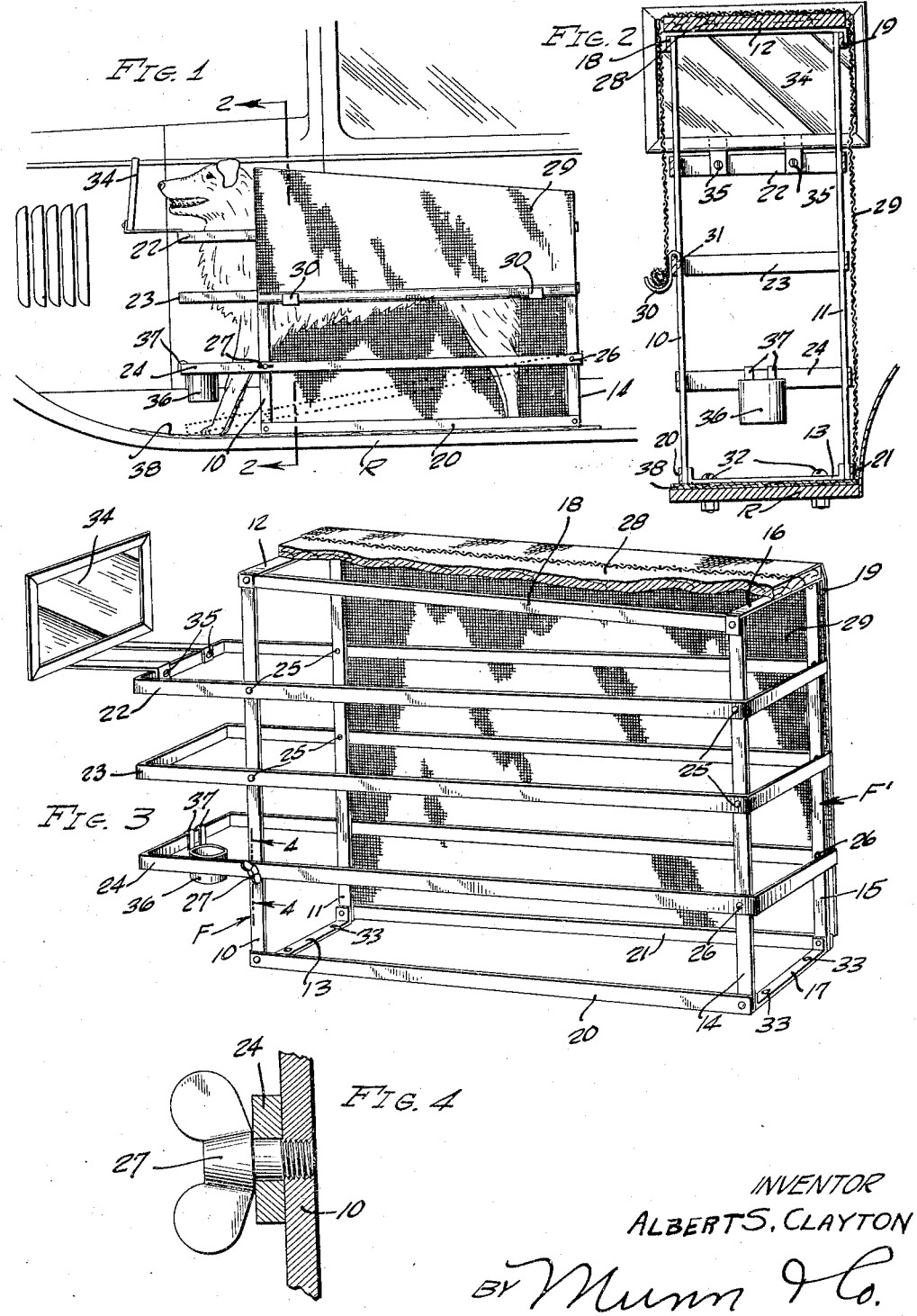
INVENTOR
ALBERT S. CLAYTON
BY Munn & Co.
ATTORNEYS Patented Apr. 15, 1930

1,754,610

UNITED STATES PATENT OFFICE

ALBERT S. CLAYTON, OF SANTA ANA, CALIFORNIA

ANIMAL CARRIER

Application filed September 10, 1928. Serial No. 304,913.

My invention relates to and has for a purpose the provision of a carrier particularly adapted, although not necessarily, for use on automobiles, and by which an animal such as a dog or other household pet, for example, can be safely and comfortably confined and protected against injury, on the running board of an automobile, all in such manner that the animal will be shielded against the elements and will have sufficient freedom of movement to permit the animal to assume various comfortable positions, to the end that humane treatment will be accorded the animal during transportation, as well as the undesirable conditions attendant confining of the animal in the vehicle with the occupants thereof, obviated.

I will describe only one form of animal carrier embodying my invention and will then point out the novel features thereof in claims.

In the accompanying drawing—

Fig. 1 is a view showing in side elevation one form of carrier embodying my invention applied to the running board of an automobile, and illustrating a dog confined in the carrier;

Fig. 2 is an enlarged sectional view taken on the line 2—2 of Fig. 1 and looking in the direction of the arrows;

Fig. 3 is a perspective view of the carrier, with a portion broken away for the sake of clearness; and Fig. 4 is a fragmentary enlarged sectional view taken on the line 4—4 of Fig. 3 and looking in the direction of the arrows.

Referring specifically to the drawing in which similar reference characters designate similar parts in each of the several views, my invention in its present embodiment comprises front and rear end frames designated generally at F and F' respectively, and preferably constructed of strap metal, the front end frame F comprising upright members 10 and 11 connected at their upper and lower extremities by cross bars 12 and 13 respectively so as to form a rigid rectangular frame, while the rear end frame F' comprises upright members 14 and 15 shorter in length than the upright members of the frame F and connected at their upper and lower extremities by cross bars 16 and 17 so as to also form a rigid rectangular frame.

The upper corners of the frames F and F' are connected by longitudinal members 18 and 19, while the lower corners of the frames are connected by longitudinal members 20 and 21 so as to form a rigid skeleton framework of such size as to comfortably enclose the particular animal for which the carrier is intended.

At substantially equally spaced intervals along the length and in intersecting relation to the upright members of the frames F and F' are a plurality of horizontal frames 22, 23, and 24 of rectangular form which cooperate with the frames F and F' to form a cage in which the animal will be confined against escape. The horizontal frames 22 and 23 are secured to the upright members of the frames F and F' by rivets 25, while the horizontal frame 24 is pivoted at 26 to the upright members of the frame F' so as to be rendered capable of being swung from the horizontal or closed position shown in full lines in Fig. 1 to the inclined or open position shown in broken lines in this figure. In the open position of the frame 24 sufficient space is provided between the forward end of the frame 24 and the frame 23 to permit the animal to be introduced into the carrier, and the frame 24 is adapted to be secured in its closed position by means of a thumb screw 27 passing freely through an opening in a longitudinal member of the frame 24 and threaded into the upright member 10 of the frame F as shown clearly in Fig. 4.

The carrier is provided with a roof 28 of wood or other suitable rigid material secured to the cross bars 12 and 16, while the rear side wall of the carrier is spanned by a sheet 29 of canvas or other suitable material which extends across the roof 28 and can be adjusted to extend more or less down the front side wall of the carrier by supporting the rolled extremity of the sheet in U shaped clips 30 having hooks 31 by which the clips are adapted to be hooked over and thus detachably secured to the longitudinal members of any of the horizontal frames 22, 23, and 24.

The occupant of the carrier will thus be protected against the elements.

The carrier is adapted to be secured to the running board R of an automobile by means of bolts 32 passing through openings 33 in the cross bars 13 and 17, so that the running board will provide the floor of the carrier, and it will be noted that the horizontal frames 22, 23, and 24 extend forwardly of the frame F a sufficient distance to permit the animal confined in the carrier to extend its head and forward portion of its body from beneath the forward end of the roof 28 and thus have an unobstructed view, as is clearly shown in Fig. 1.

If desired, a suitable windshield 34 of celluloid or other suitable material can be secured by bolts 35 to the forward end of the horizontal frame 22 as clearly shown in Fig. 3 so as to protect the eyes of the animal against the wind and dust, and a drinking cup 36 provided with hooks 37 can be detachably secured to the horizontal frame 24 as also shown in Fig. 3.

A mat 38 can be placed over the running board within the carrier or interposed between the carrier and running board for the purpose of protecting the latter as well as providing a comfortable floor covering for the animal.

Although I have herein shown and described only one form of animal carrier embodying my invention, it is to be understood that various changes and modifications may be made therein without departing from the spirit of the invention and the spirit and scope of the appended claims.

I claim:

1. An animal carrier comprising front and rear vertical frames, a plurality of spaced apart horizontal frames spanning the vertical frames and co-operating therewith to provide an enclosure in which an animal is adapted to be confined, one of the horizontal frames being pivoted to one of the vertical frames to permit swinging movement of said one of the horizontal frames to an inclined position to provide an opening sufficiently large for the passage of the animal, and means by which said one of the horizontal frames is adapted to be secured in its normal horizontal position wherein said opening is decreased in size sufficiently to prevent escape of the animal through the opening.

2. An animal carrier comprisng front and rear vertical frames, a plurality of spaced apart horizontal frames spanning the vertical frames and co-operating therewith to provide an enclosure in which an animal is adapted to be confined, one of the horizontal frames being pivoted to one of the vertical frames to permit swinging movement of said one of the horizontal frames to an inclined position to provide an opening sufficiently large for the pasasge of the animal, and means by which said one of the horizontal frames is adapted to be secured in its normal horizontal position wherein said opening is decreased in size sufficiently to prevent escape of the animal through the opening comprising a fastening member for detachably securing said one of the horizontal frames to the other of the vertical frames.

3. An animal carrier comprising front and rear vertical frames, a plurality of spaced apart horizontal frames spanning the vertical frames and co-operating therewith to provide an enclosure in which an animal is adapted to be confined, one of the horizontal frames being pivoted to one of the vertical frames to permit swinging movement of said one of the horizontal frames to an inclined position to provide an opening sufficiently large for the passage of the animal, means by which said one of the horizontal frames is adapted to be secured in its normal horizontal position wherein said opening is decreased in size sufficiently to prevent escape of the animal through the opening, a roof spanning and secured to the vertical frame, one end of the horizontal frames projecting beyond the respective vertical frame a sufficient distance to permit the animal confined in the carrier to extend its head and the forward portion of its body from beneath the roof so that the animal will have an unobstructed view.

4. An animal carrier comprising front and rear vertical frames, horizontal frames spanning the vertical frames at intervals and co-operating with the latter frames to provide an enclosure in which an animal is adapted to be confined, one of the horizontal frames being mounted for movement on one of the vertical frames to permit movement of said one of the horizontal frames to one position wherein an opening is provided in the carrier, sufficiently large for the passage of the animal, and another position wherein the size of the opening is decreased sufficiently to prevent escape of the animal therethrough, and means for detachably securing said one of the horizontal frames in its last mentioned position.

5. An animal carrier comprising intersecting frames co-operating to provide an animal confining enclosure, and adapted to be secured on a running board of an automobile, means for rendering one of the frames movable in such manner as to provide an opening in the carrier of sufficient size to permit passage of the animal, and means for securing said one of the frames in a position wherein the opening is decreased in size sufficiently to prevent the escape of the animal.

6. An animal carrier comprising front and rear end frames each of which comprises a pair of upright members, and cross bars connecting the members to provide a rectangular frame, longitudinal members spanning the front and rear frames at the corners thereof to rigidly connect the frames in definite spaced relation, a plurality of rectangular horizontal frames spanning the upright members of the front and rear frames at spaced intervals and co-operating with the frames to provide an animal confining enclosure, and a roof overlying and spanning the front and rear end frames, the lowermost horizontal frame being pivoted to the upright members of one of the end frames so as to be rendered capable of being swung downwardly to an inclined position and thereby provide between its free extremity and the adjacent horizontal frame above, an opening of sufficient size to permit passage of the animal, and means for detachably securing the lowermost horizontal frame in horizontal position.

7. An animal carrier comprising front and rear end frames each of which comprises a pair of upright members, and cross bars connecting the members to provide a rectangular frame, longitudinal members spanning the front and rear frames at the corners thereof to rigidly connect the frames in definite spaced relation, a plurality of rectangular horizontal frames spanning the upright members of the front and rear frames at spaced intervals and co-operating with the frames to provide an animal confining enclosure, and a roof overlying and spanning the front and rear end frames, the horizontal frames projecting at one of their ends a sufficient distance beyond the roof to permit the animal confined in the carrier to extend its head beyond the roof so that its view will be unobstructed by the roof.

8. An animal carrier comprising front and rear end frames each of which comprises a pair of upright members, and cross bars connecting the members to provide a rectangular frame, longitudinal members spanning the front and rear frames at the corners thereof to rigidly connect the frames in definite spaced relation, a plurality of rectangular horizontal frames spanning the upright members of the front and rear frames at spaced intervals and co-operating with the frames to provide an animal confining enclosure, and a roof overlying and spanning the front and rear end frames, the lowermost horizontal frame being pivoted to the upright members of one of the end frames so as to be rendered capable of being swung downwardly to an inclined position and thereby provide between its free extremity and the adjacent horizontal frame above, an opening of sufficient size to permit passage of the animal, and means for detachably securing the lowermost horizontal frame in horizontal position, the horizontal frames projecting at one of their ends a sufficient distance beyond the roof to permit the animal confined in the carrier to extend its head beyond the roof so that its view will be unobstructed by the roof.

9. An animal carrier comprising front and rear end frames each of which comprises a pair of upright members, and cross bars connecting the members to provide a rectangular frame, longitudinal members spanning the front and rear frames at the corners thereof to rigidly connect the frames in definite spaced relation, a plurality of rectangular horizontal frames spanning the upright members of the front and rear frames at spaced intervals and co-operating with the frames to provide an animal confining enclosure, a roof overlying and spanning the front and rear end frames, the lowermost horizontal frame being pivoted to the upright members of one of the end frames so as to be rendered capable of being swung downwardly to an inclined position and thereby provide, between its free extremity and the adjacent horizontal frame above, an opening of sufficient size to permit passage of the animal, means for detachably securing the lowermost horizontal frame in horizontal position, a flexible curtain closing one side of the carrier and adapted to be adjusted to extend down the other side of the carrier to a greater or less extent, and means for maintaining the curtain in adjusted position.

Signed at Santa Ana in the county of Orange and State of California this 28th day of August A. D. 1928.

ALBERT S. CLAYTON.